US012504134B1

(12) United States Patent
Weber et al.

(10) Patent No.: US 12,504,134 B1
(45) Date of Patent: Dec. 23, 2025

(54) MODULAR DECOR APPARATUS

(71) Applicant: LIV Lifestyle Co., Minneapolis, MN (US)

(72) Inventors: Jeff Weber, Minneapolis, MN (US); Shawn Monitor, Minneapolis, MN (US); Jason Holt, Minneapolis, MN (US)

(73) Assignee: LIV Lifestyle Co., Minneapolis, MN (US)

( * ) Notice: Subject to any disclaimer, the term of this patent is extended or adjusted under 35 U.S.C. 154(b) by 0 days.

(21) Appl. No.: 19/038,316

(22) Filed: Jan. 27, 2025

(51) Int. Cl.

| | |
|---|---|
| ***F21S 2/00*** | (2016.01) |
| ***F21S 6/00*** | (2006.01) |
| ***F21S 8/04*** | (2006.01) |
| ***F21S 8/06*** | (2006.01) |
| ***F21S 8/08*** | (2006.01) |
| ***F21S 9/02*** | (2006.01) |

(Continued)

(52) U.S. Cl.
CPC ............... *F21S 2/005* (2013.01); *F21S 6/008* (2013.01); *F21S 8/04* (2013.01); *F21S 8/066* (2013.01); *F21S 8/08* (2013.01); *F21S 9/02* (2013.01); *F21V 21/096* (2013.01); *F21V 21/108* (2013.01); *F21V 21/116* (2013.01); *F21V 23/001* (2013.01); *F21V 23/04* (2013.01); *F21V 23/06* (2013.01)

(58) Field of Classification Search
CPC .... F21S 2/005; F21S 9/02; F21S 6/005; F21S 6/006; F21S 6/007; F21S 6/008; F21S 8/04; F21S 8/043; F21S 8/046; F21S 8/066; F21S 8/08; F21V 21/108; F21V 21/116; F21V 21/96; F21V 19/00; F21V 23/001; F21V 23/04; F21V 23/06; H02J 7/0042; H02J 50/005; H04R 1/02; H04R 1/021; H04R 1/023; H04R 1/025; H04R 1/026; H04R 2201/003; H04R 2201/02; H04R 2201/021; H04R 2201/023; H04R 2201/025; H04R 2201/028
USPC .................................. 362/418; 320/108, 114
See application file for complete search history.

(56) References Cited

U.S. PATENT DOCUMENTS 3,985,924 A * 10/1976 Pritza ...................... F21V 21/13 362/123
7,237,932 B2 * 7/2007 Ter-Hovhannissian ...................... B60Q 1/32 362/487

(Continued)

FOREIGN PATENT DOCUMENTS

DE 202004006022 U1 * 6/2004 ............ F21V 21/002

*Primary Examiner* — Laura K Tso
(74) *Attorney, Agent, or Firm* — Best & Flanagan LLP

(57) ABSTRACT

A modular decor apparatus includes a base, an elongated charging member, and at least one modular powered unit removably coupled to the elongated charging member by a magnetic force. The elongated charging member has a first end connected to the base and a second end. The elongated charging member extends from the base from the first end to the second end, and comprises at least one shaft and a current carrying conductor coiled around the at least one shaft. The current carrying conductor generates an electrical signal from a power source. The at least one modular powered unit is capable of receiving the electrical signal from the elongated charging unit to power the at least one modular powered unit. The at least one modular powered unit can be a task light, an ambient light, a ring light, a speaker, and/or a charging port, among other examples.

20 Claims, 12 Drawing Sheets

(51) Int. Cl.

| | |
|---|---|
| ***F21V 21/096*** | (2006.01) |
| ***F21V 21/108*** | (2006.01) |
| ***F21V 21/116*** | (2006.01) |
| ***F21V 23/00*** | (2015.01) |
| ***F21V 23/04*** | (2006.01) |
| ***F21V 23/06*** | (2006.01) |

(56) References Cited

U.S. PATENT DOCUMENTS

| | | | | |
|---|---|---|---|---|
| 8,864,337 | B2 * | 10/2014 | Rains | F21L 4/00 362/183 |
| 2007/0153550 | A1 * | 7/2007 | Lehman | H01R 25/147 362/648 |
| 2008/0016613 | A1 * | 1/2008 | Chien | A47K 3/38 4/558 |
| 2008/0247155 | A1 * | 10/2008 | Allsop | F21S 8/081 362/183 |
| 2018/0128466 | A1 * | 5/2018 | Sonneman | F21S 2/005 |

* cited by examiner

MODULAR DECOR APPARATUS

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Decorative lighting units, beyond being decorative, typically serve the utility function of providing light based on an electrical connection. Multi-functional lighting units may contain more than one light or may contain additional elements that serve various utility purposes. Such units, however, are typically integrated and static, and the utility function of such a unit cannot be adjusted after the unit is manufactured and/or installed. Thus, a decorative apparatus with changeability in its utility purpose is desirable.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

A modular decor apparatus includes a base, an elongated charging member, and at least one modular powered unit removably coupled to the elongated charging member by a magnetic force. The elongated charging member has a first end connected to the base and a second end. The elongated charging member extends from the base from the first end to the second end, and comprises at least one shaft and a current carrying conductor coiled around the at least one shaft. The current carrying conductor generates an electrical signal from a power source. The at least one modular powered unit is capable of receiving the electrical signal from the elongated charging unit to power the at least one modular powered unit.

A modular decor apparatus includes a base, an elongated charging member, a first modular powered unit removably coupled to the elongated charging member by a magnetic force, and a second modular powered unit removably coupled to the elongated charging member by a magnetic force. The elongated charging member has a first end connected to the base and a second end. The elongated charging member extends from the base from the first end to the second end, and comprises at least one shaft and a current carrying conductor coiled around the at least one shaft. The current carrying conductor generates an electrical signal from a power source. The first modular powered unit is capable of receiving the electrical signal from the elongated charging unit to power the first modular powered unit. The first modular powered unit is translatable along a longitudinal axis of the at least one shaft and rotatable about the at least one shaft. The second modular powered unit is capable of receiving the electrical signal from the elongated charging unit to power the second modular powered unity. The second modular powered unit is translatable along a longitudinal axis of the at least one shaft and rotatable about the at least one shaft.

A modular decor apparatus, includes at least one base, at least one elongated charging member, and at least one modular powered unit coupled to the elongated charging member by a magnetic force. The elongated charging member includes at least one track extending from the base and a current carrying conductor coiled around the at least one track. The current carrying conductor conducts an electrical signal from a power source. The at least one modular powered unit is capable of receiving the electrical signal from the elongated charging member to power the at least one modular powered unit.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the disclosure will be better understood from the following description taken in conjunction with the accompanying Figures, in which:

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, and/or components have not been described in detail so as not to obscure the discussion.

The present disclosure describes a novel and advantageous modular decor apparatus including corresponding modular units. The modular decor apparatus comprises a base, an elongated charging member, and various modular units, removably connectable to the elongated charging member. A current carrying conductor is coiled around the elongated charging member, thereby magnetizing the elongated charging member for magnetic connection of the modular units and providing a power source for the connected modular units. The base of the modular decor apparatus can be an annular base allowing the lighting unit to stand on, for example, a floor and/or a desk. The base can also be suitable for attachment to a wall via adhesive or via other fixed attachment mechanisms. The base can also be suitable for other lighting configurations such as a ceiling-mounted chandelier or track lighting configuration. The modular units can include any number of attachable modules including, for example, a task light modular unit, an ambient light modular unit, an electrical connection port modular unit, and a speaker modular unit. Additional examples of attachable modular units will be described further in the description below.

Figure 1B:
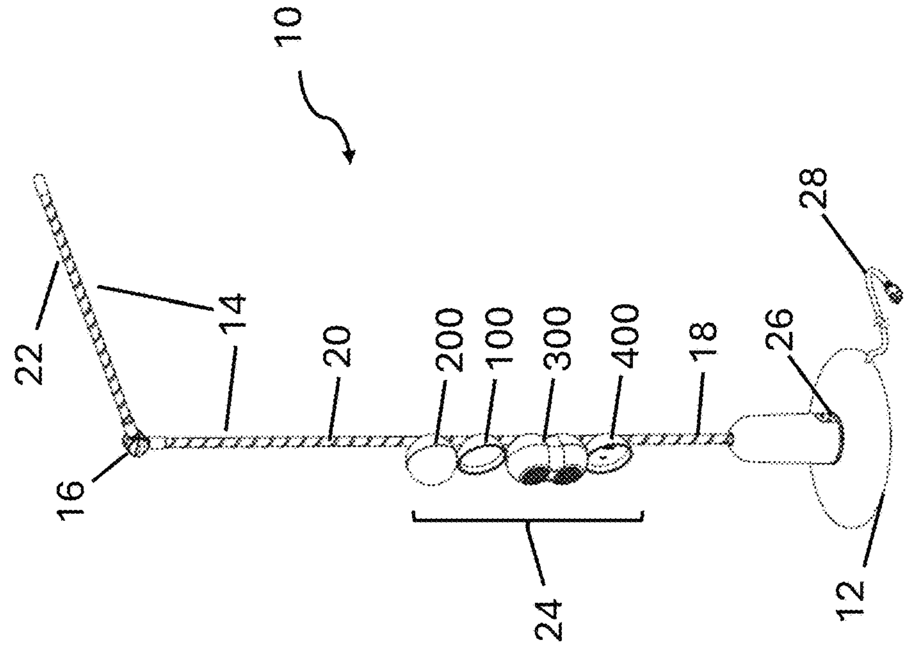
FIG. 1B is a perspective view of the modular decor apparatus having the floor base and including multiple attachable modular units.
Figure 1A:
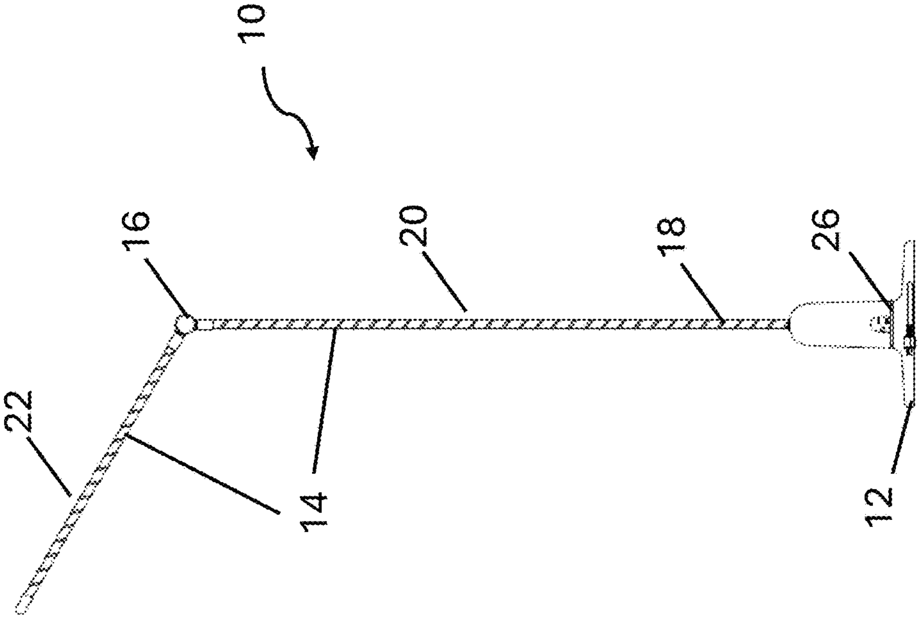
FIG. 1A is a perspective view of a modular decor apparatus having a floor base.
Figure 2B:
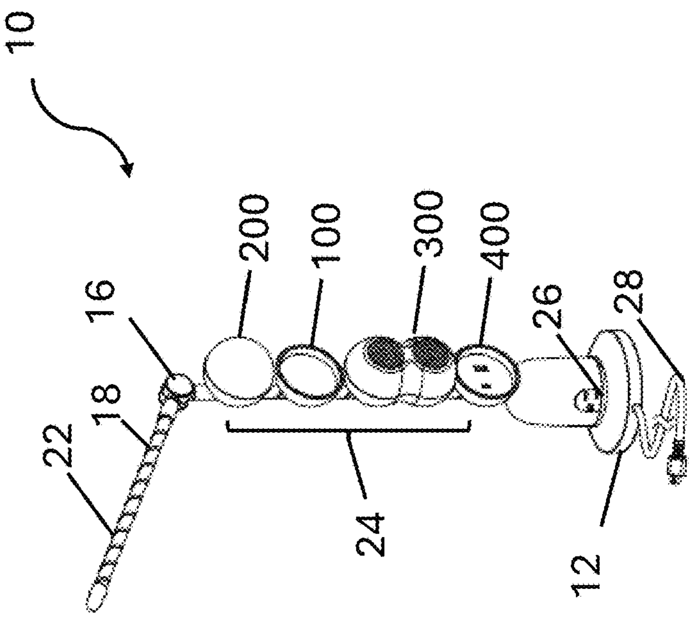
FIG. 2B is a perspective view of the modular decor apparatus having the desk base and including multiple attachable modular units.

FIGS. 1A-2B depict perspective views of various embodiments of modular decor apparatus 10. FIGS. 1A-2B will be described together. Modular decor apparatus 10 includes base 12, elongated charging member 14, hinge unit 16, and conductor 18. Base 12 includes ring light 26 and power connection 28. Elongated charging member 14 includes vertical shaft 20 and pivot shaft 22. FIGS. 1B and 2B additionally depict modular units 24. Modular units 24 include task light modular unit 100, ambient light modular unit 200, wireless speaker modular unit 300, and charging port modular unit 400.

Figure 2A:
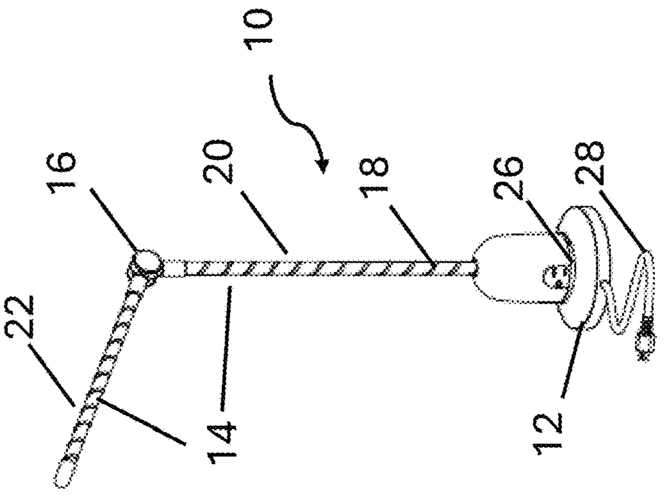
FIG. 2A is perspective view of the modular decor apparatus having a desk base.

FIGS. 1A and 1B depict base 12 to be circumferentially wider than base 12 as depicted in FIGS. 2A and 2B. FIGS. 1A and 1B also depict elongated charging member 14 to be longer than elongated charging member 14 as depicted in FIGS. 2A and 2B. FIGS. 1A and 1B can be directed to, for example, an embodiment where modular decor apparatus 10 is floor mounted (i.e., base 12 rests on a floor), whereas FIGS. 2A and 2B can be directed to, for example, an embodiment where modular decor apparatus 10 is desk mounted (i.e., base 12 rests on a desk). In some embodiments, base 12 can be configured to attach to a ceiling. In such an embodiment, elongated charging member 14 can be arranged in a hanging chandelier configuration. Examples of such ceiling mounted embodiments are shown in FIGS. 5A-7C.

In some embodiments, modular decor apparatus 10 can include elongated charging member 14 as part of a track lighting system. In such an embodiment, base 12 can be mounted on a ceiling, or other suitable surface. In such an embodiment, elongated charging member 14 can include a track extending horizontally from base 12, and conductor 18 coiled around the track. It is understood that any combination of sizes and lengths of base 12 and elongated charging member 14 can be combined based on the suitability of such dimensions for various mounting locations of modular decor apparatus 10.

Elongated charging member 14 can also, in some embodiments, be a singular rod (i.e., without hinge unit 16). Elongated charging member 14 can be, for example, made from flexible and/or bendable material, thereby allowing modular decor apparatus 10 to be moldable into a desired shape.

Vertical shaft 20 of elongated charging member 14 extends vertically from base 12. Hinge unit 16 connects vertical shaft 20 and pivot shaft 22 of elongated charging member 14. Hinge unit 16 thus allows pivot shaft 22 to pivot about an axis with respect to vertical shaft 20. In some embodiments, the pivotability of pivot shaft 22 is bidirectional. In other embodiments, pivot shaft 22 is pivotable in any direction. Conductor 18 is coiled around elongated charging member 14. In some embodiments, conductor 18 is embedded within elongated charging member 14. In other embodiments, conductor 18 is removably coupled to elongated charging member 14.

Base 12 is electrically connected to a power source (not depicted) via a connection between power connection 28 and the power source. In some embodiments, an inline switch exists between base 12 and the power source along power connection 28. In such an embodiment, the inline switch can be toggled to enable or disable the connection between modular decor apparatus 10 and the power source. In some embodiments, the switch is housed within base 12, and can be touch-activated. Additional switch types for enabling or disabling the connection between modular decor apparatus 10 and the power source can be implemented and are contemplated by this disclosure. Ring light 26 can be configured to turn on when power is flowing from the power source to base 12, and/or when toggled by the on/off switch described.

Conductor 18 is electrically connected to base 12 such that current flows from the power source through conductor 18. Modular units 24 are magnetically removably coupled to elongated charging member 14. In the depicted embodiments of FIG. 1B and FIG. 2B, modular units 24 are depicted as being attached to vertical shaft 20, but it is understood that modular units 24 can be magnetically removably coupled to vertical shaft 20 and/or pivot shaft 22 of elongated charging member 14. Any number of modular units 24 can be coupled to elongated charging member 14. Any number of modular units can be coupled to vertical shaft 20 and/or pivot shaft 22. In a track lighting embodiment, modular units 24 can be magnetically removably coupled to the track of elongated charging member 14, whether the track is vertically, horizontally, or otherwise positioned with respect to base 12.

The magnetic connection between modular units 24 and elongated charging member 14 is accomplished via the magnetic field created by current flowing through conductor 18, which magnetizes elongated charging member 14. The structure of modular units 24 and magnetic connection between modular units 24 and elongated charging member 14 will be described in additional detail in the description of FIG. 4 below. Modular units 24 are also electrically coupled to conductor 18, thereby allowing power to flow from the power source, through conductor 18, and through modular units 24.

In operation, base 12 connects to a power source, such as, for example, a wall outlet, via power connection 28, thereby powering modular decor apparatus 10. In some embodiments, the power source is a battery housed within base 12. In such an embodiment, power connection 28 can exist as a back up power source, or be removed from modular decor apparatus 10. Current from the power source flows through base 12 and through conductor 18. Modular units 24 coupled to elongated charging member 14 are powered via the current flowing through conductor 18.

Modular units 24 are rotatable around elongated charging member 14. In some embodiments, modular units 24 can be rotated around elongated charging member 14, while maintaining the electrical connection between modular units 24 and conductor 18. In such an embodiment, modular units 24 can be rotated while maintaining power supplied via the connection to conductor 18. Alternatively, modular units 24 can be magnetically detached, rotated, and thereafter magnetically re-coupled to elongated charging member 14. In the depicted embodiments of FIGS. 1B and 2B, task light modular unit 100, ambient light modular unit 200, wireless speaker modular unit 300, and charging port(s) modular unit 400 are oriented in the same rotational direction about elongated charging member 14. It is understood that this is merely an example, and that each individual unit within modular units 24 (e.g., task light modular unit 100, ambient light modular unit 200, wireless speaker modular unit 300, and charging port(s) modular unit 400) can be oriented in any rotational direction, whether the same or different as other modular units within modular units 24.

Additionally, modular units 24 are longitudinally translatable along elongated charging member 14. In some embodiments, modular units 24 can be longitudinally translated along elongated charging member 14, while maintaining the electrical connection between modular units 24 and conductor 18. In such an embodiment, modular units 24 can be longitudinally translated while maintaining power supplied via the connection to conductor 18. Alternatively, modular units 24 can be magnetically detached, longitudinally translated, and thereafter magnetically re-coupled to elongated charging member 14 and hence electrically re-coupled to conductor 18. Modular units 24 can be simultaneously rotated and longitudinally translated along elongated charging member 14.

Figure 3B:
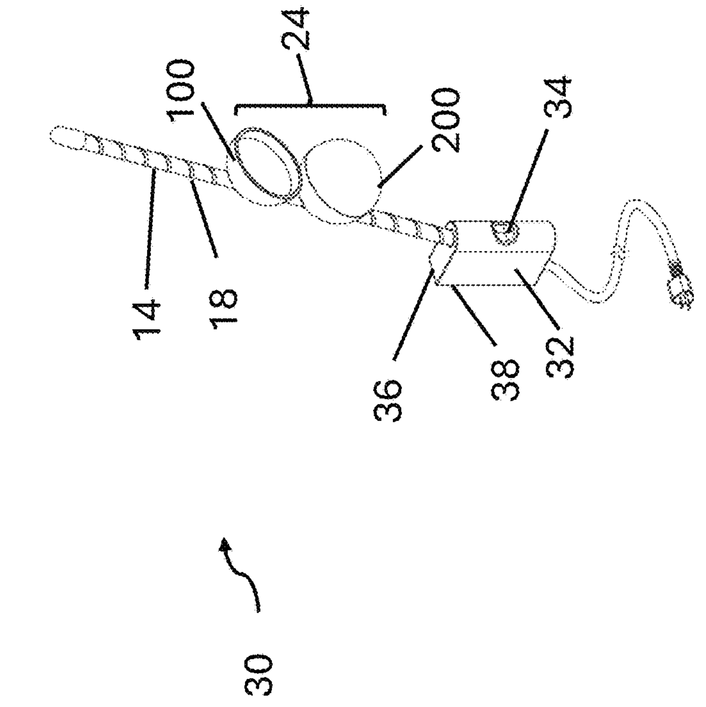
FIG. 3B is a perspective view of the modular decor apparatus having the base attachable to the wall and including the multiple attachable modular units.
Figure 3A:
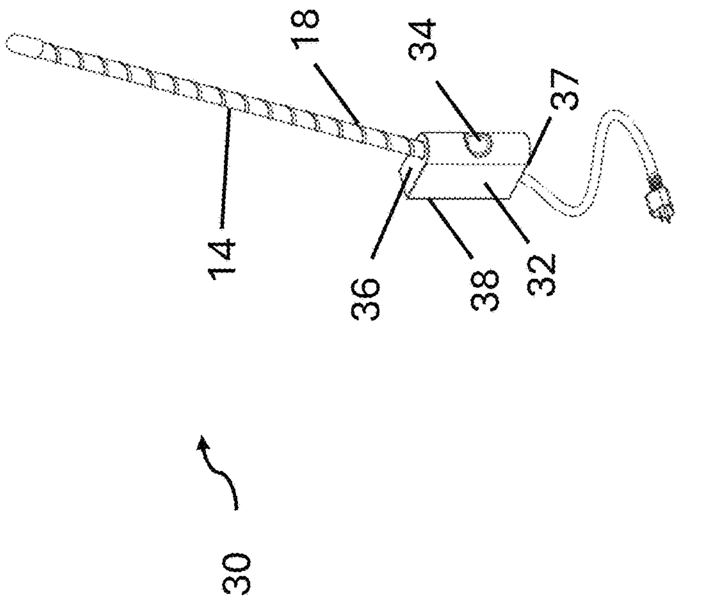
FIG. 3A is a perspective view of the modular decor apparatus having a base attachable to a wall.

FIGS. 3A and 3B depict a perspective view of modular decor apparatus 30. Modular decor apparatus 30 is an embodiment of modular decor apparatus 10 that is configured to be mounted on a wall, or a similar mounting surface. Modular decor apparatus 30 includes base 32, elongated charging member 14, and conductor 18. Base 32 includes power connection 28, switch 34, top side 36, bottom side 37, and mounting side 38.

In the depicted embodiment, elongated charging member 14 is a shaft extending from top side 36 of base 32. It is understood however that additional shafts, such as vertical shaft 20 and pivot shaft 22 of FIGS. 1A-2B, can be used in the embodiment of modular decor apparatus 30. FIG. 3B additionally depicts modular units 24. Modular units 24 include task light modular unit 100 and ambient light modular unit 200. It is understood that any number of modular units 24 can be a part of modular decor apparatus 30.

Base 32 is electrically connected to a power source (not depicted) via a connection between power connection 28 and the power source. In the depicted embodiment, power connection 28 extends from bottom side 37 of base 12, though it is understood that power connection can extend from any side of base 12. In some embodiments, base 12 can house a battery as the power source. Switch 34 can be toggled to enable or disable the connection between modular decor apparatus 10 and the power source. In some embodiments, switch 34 is touch-activated. Additional switch types for enabling or disabling the connection between modular decor apparatus 30 and the power source can be implemented and are contemplated by this disclosure.

Conductor 18 is electrically connected to base 32 such that current flows from the power source through conductor 18. As described with respect to FIGS. 1A-2B, modular units 24 are magnetically removably coupled to elongated charging member 14. Any number of modular units 24 can be coupled to elongated charging member 14.

Base 32 can be removably or fixedly mounted to a wall or other mounting surface by coupling mounting side 38 to the mounting surface. In some embodiments, base 32 is removably attached via an adhesive connecting mounting side 38 to the mounting surface. In other embodiments, base 32 is fixedly attached to the mounting surface via adhesive, wall sconce, or other suitable attachment mechanisms.

Modular decor apparatus 30 operates akin to modular decor apparatus 10. Base 32 connects to a power source via power connection 28, thereby powering modular decor apparatus 32. Current from the power source flows through base 32 and through conductor 18. Modular units 24 coupled to elongated charging member 14 are powered via the current flowing through conductor 18.

The embodiments depicted of modular decor apparatus 10 and modular decor apparatus 30 provide several advantages. Modular decor apparatus 10 allows for multiple modules (i.e., modular units 24) to be mounted upon a singular apparatus, thereby allowing the singular apparatus to have a multitude of functions. As described, modular units 24 can include task light modular unit 100, ambient light modular unit 200, wireless speaker modular unit 300, and charging port(s) modular unit 400, providing for a variety of functions.

Further, the use of conductor 18 allows for magnetic attachment, detachment, rotation, and translation of modular units 24 about elongated charging member 14. Pivot shaft 22 allows for an additional dimension of movement of modular units 24 when mounted to pivot shaft 22. Thus, for example, lighting (e.g., from task light modular unit 100, ambient light modular unit 200), sound (e.g., from wireless speaker modular unit 300) and cabling (e.g., connected to charging port(s) modular unit 400) can be directed as desired. Additionally, the electrical connection between modular units 24 and conductor 18 via mounting modular units 24 on elongated charging member 14 allows for a singular connection between modular decor apparatus 10 or modular decor apparatus 30 and a power source to power all modular units 24 which are coupled to elongated charging member 14.

Figure 4:
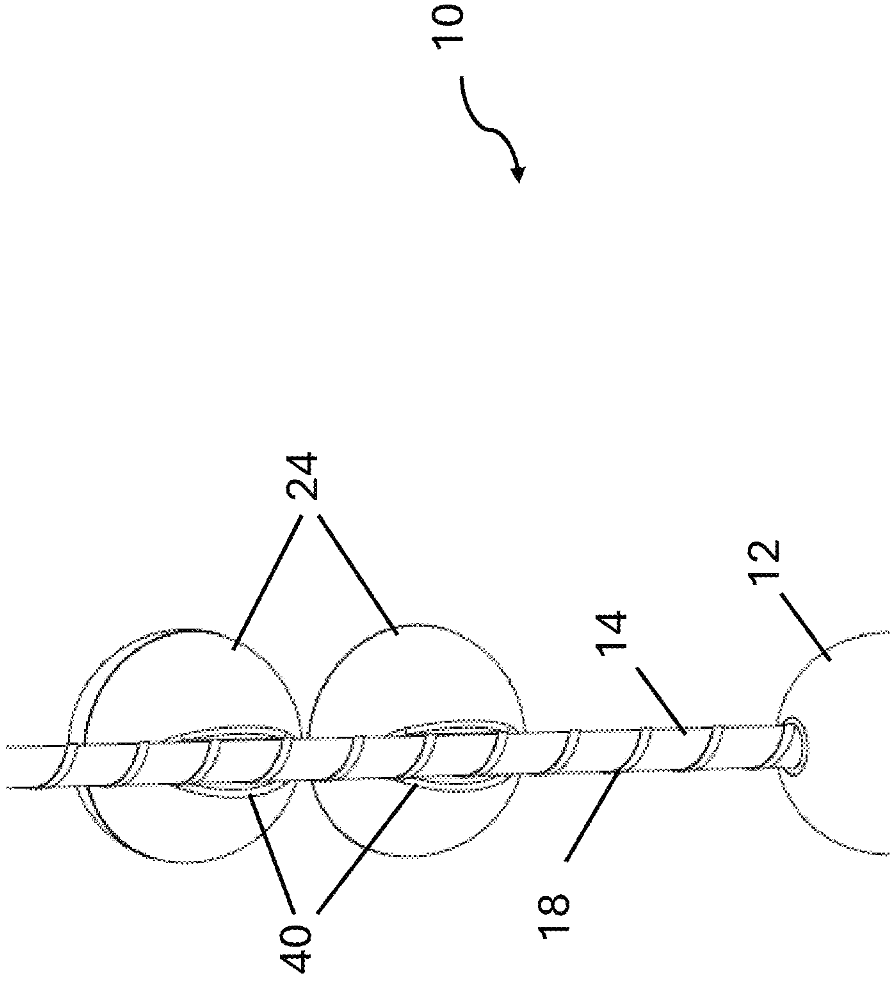
FIG. 4 is a perspective view of an elongated charging member within the modular decor apparatus including the multiple attachable modular units.

FIG. 4 is a perspective view of elongated charging member 14 within modular decor apparatus 10 including modular units 24. FIG. 4 depicts base 12, elongated charging member 14, conductor 18, and modular units 24. Modular units 24 include connection cavity 40.

Elongated charging member 14 extends from base 12. Conductor 18 is coiled around elongated charging member 14. Modular units 24 are magnetically mounted to elongated charging member 14, as described in the description of FIGS. 1A-3B. Modular units 24 are mounted such that a magnetic connection is formed between connection cavity 40 and elongated charging member 14, and elongated charging member 14 is encompassed within connection cavity 40.

In operation, current from the power source flows through base 12 and through conductor 18. Modular units 24 coupled to elongated charging member 14 are powered via the current flowing through conductor 18. As depicted, modular units 24 are magnetically connected to elongated charging member 14. Modular units 24 are also electrically coupled to conductor 18 through electrical contact lines contained within connection cavity 40 of modular units 24. Thus, when mounted on elongated charging member 14, modular units 24 receive current flow through conductor 18 by virtue of electrical contact lines within connection cavity 40, thereby allowing modular units 24 to be electrically powered. The electrical contact lines for each of modular units 24 will be depicted and described in greater detail in the description of FIGS. 8A-12E.

As described with respect to FIGS. 1A-3B, modular units 24 can be rotated or longitudinally translated about elongated charging member 14. In some embodiments, rotation or translation can occur while connection cavity 40 for modular units 24 is/are in contact with elongated charging member 14, thereby maintaining electrical power delivery to modular units 24 during rotation or translation. In other embodiments, rotation or translation is accomplished by removing the contact between connection cavity 40 and elongated charging member 14 and thus removing electrical power from modular units 24, then re-coupling the connection cavity 40 to elongated charging member after rotation and translation, thereby re-establishing electrical power to modular units 24.

Modular decor apparatus 10 as depicted in FIG. 4 demonstrates the maneuverability and ease of attachment of modular units 24. As described, modular units 24 magnetically attach to elongated charging member 14 and are secured by connection cavity 40. Further, connection cavity 40 allows for ease of rotational and/or linear translation. Electrical connection to power modular units is established simply by magnetically coupling modular units 24 to elongated charging member 14.

Figure 5C:
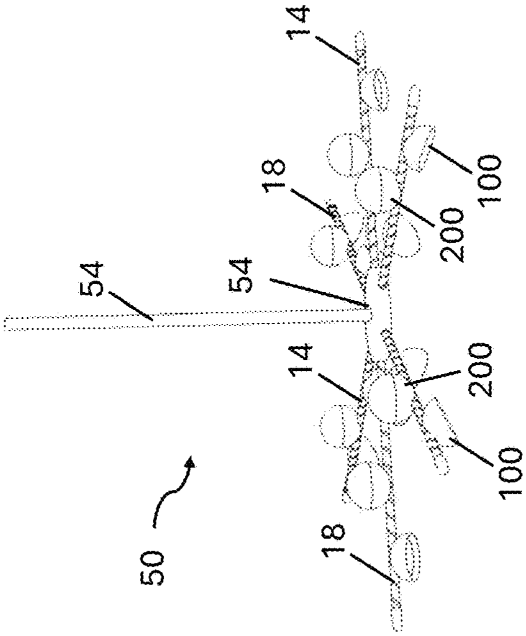
FIG. 5C is a perspective view of a first embodiment of the modular decor apparatus attachable to the ceiling and including the multiple attachable modular units.
Figure 5B:
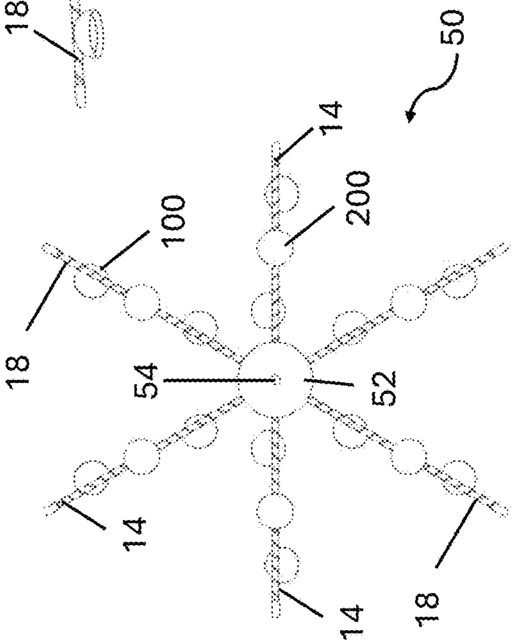
FIG. 5B is a top view of a first embodiment of the modular decor apparatus attachable to the ceiling and including the multiple attachable modular units.
Figure 5A:
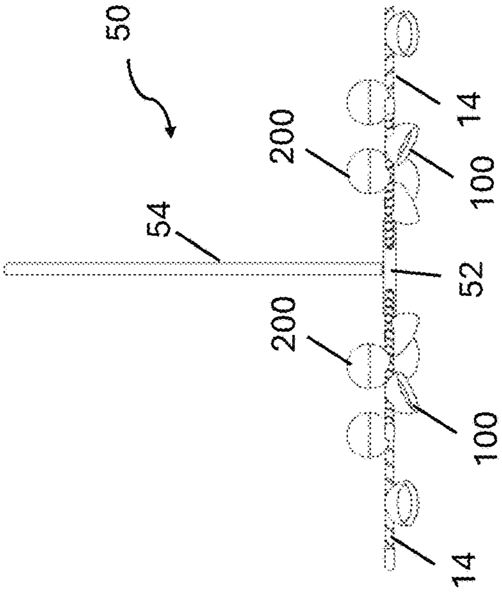
FIG. 5A is a side view of a first embodiment of the modular decor apparatus attachable to a ceiling and including the multiple attachable modular units.

FIGS. 5A-5C depict a side, top, and perspective view of modular decor apparatus 50. Modular decor apparatus 50 is a first embodiment of modular decor apparatus 10 that is configured to be mounted on a ceiling, or a similar mounting surface. Modular decor apparatus 50 includes base 52, elongated charging members 14, conductors 18, ceiling connecting rod 54, and modular units 24. Modular units 24 include task light modular unit 100, ambient light modular unit 200.

Modular decor apparatus 50 of FIGS. 5A-5C differs from the embodiment of modular decor apparatus 10 of FIGS. 1A-2B in the layout of the component parts. Within modular decor apparatus 50, elongated charging members 14 are distributed in a circular fashion about base 52, extending horizontally therefrom. In the depicted embodiment of FIGS. 5A-C, six elongated charging members 14 extend from base 52, though it is understood that any number of elongated charging members 14 can extend from base 52. Further, within modular decor apparatus 50, base 52 is connected to the ceiling via ceiling connecting rod 54. Ceiling connecting rod 54 can be connected to a power source, thereby allowing power to flow through ceiling connecting rod 54, and through elongated charging members 14 via conductors 18. The magnetic attachment of modular units 24 occurs in the same fashion as those of the floor and desk mounted embodiment of modular decor apparatus 10, as described in the description of FIGS. 1A-2B. While the depicted embodiment of FIGS. 5A-5C shows task light modular unit 100 and ambient light modular unit 200, it is understood that any additional or alternative modular units 24 can be included.

Modular decor apparatus 50 in the embodiment of FIGS. 5A-5C operates akin to modular decor apparatus 10 of FIGS. 1A-2B. Base 52 connects to a power source through ceiling connecting rod 54, thereby powering modular decor apparatus 50. Current from the power source flows through base 52 and through conductors 18, magnetizing elongated charging members 14. Modular units 24 coupled to elongated charging member 14 are powered via the current flowing through conductor 18.

Figure 6C:
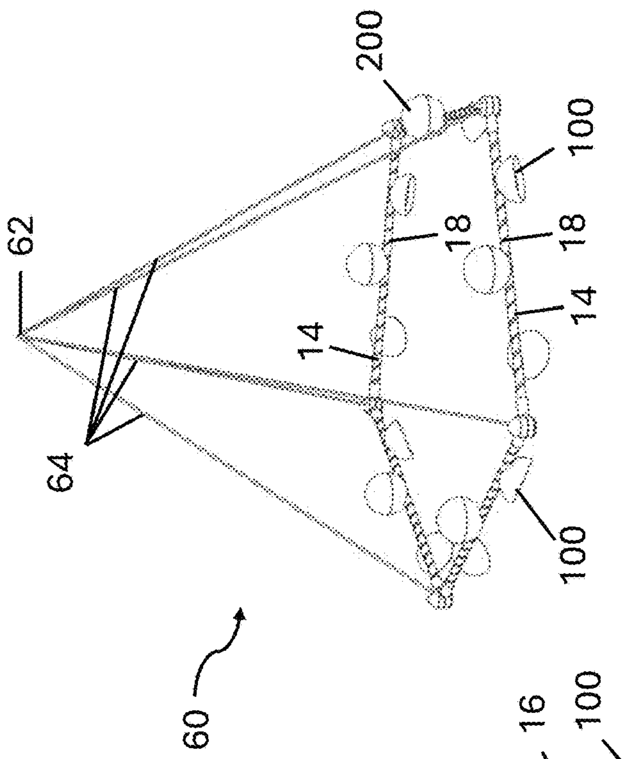
FIG. 6C is a perspective view of a second embodiment of the modular decor apparatus attachable to a ceiling and including the multiple attachable modular units.
Figure 6B:
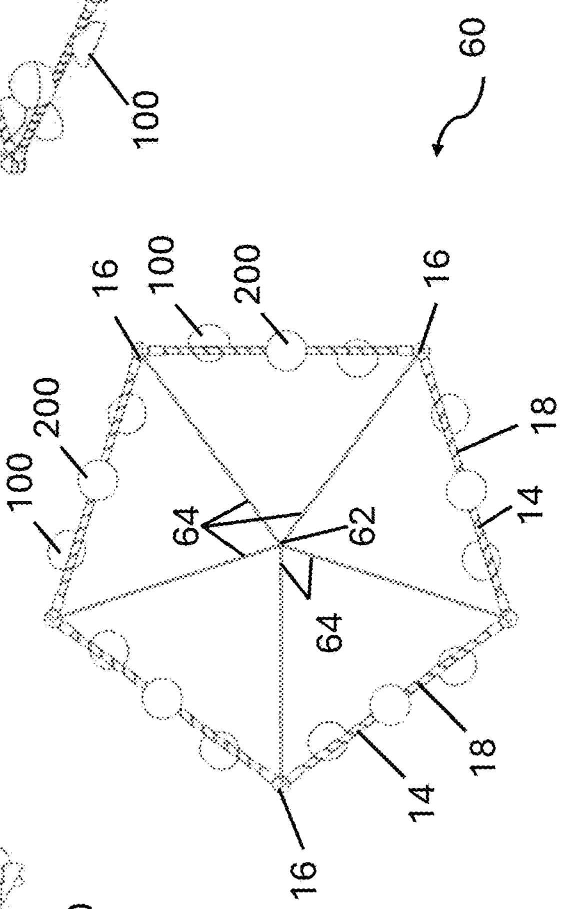
FIG. 6B is a top view of a second embodiment of the modular decor apparatus attachable to the ceiling and including the multiple attachable modular units.
Figure 6A:
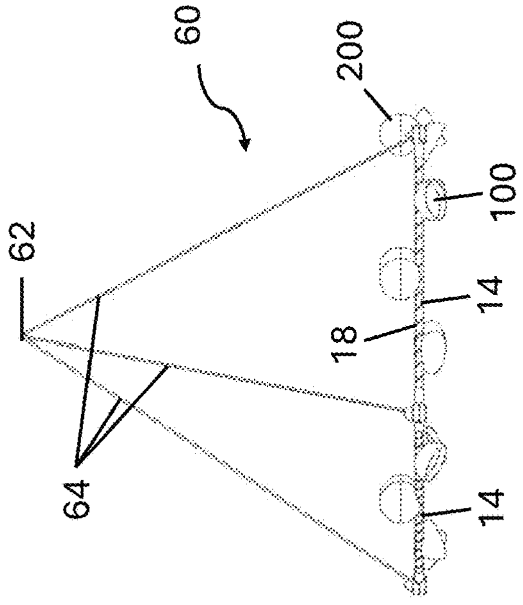
FIG. 6A is a side view of a second embodiment of the modular decor apparatus attachable to the ceiling and including the multiple attachable modular units.

FIGS. 6A-6C depict a side, top, and perspective view of modular decor apparatus 60. Modular decor apparatus 60 is a second embodiment of modular decor apparatus 10 that is configured to be mounted on a ceiling, or a similar mounting surface. Modular decor apparatus 60 includes vertex 62, ceiling connecting wires 64, elongated charging members 14, hinge units 16, conductors 18, and modular units 24. Modular units 24 include task light modular unit 100, ambient light modular unit 200.

Modular decor apparatus 60 of FIGS. 6A-6C differs from the embodiment of modular decor apparatus 10 of FIGS. 1A-2B in the layout of the component parts. Within modular decor apparatus 60, elongated charging members 14 are distributed in a closed loop shape, whereby each elongated charging member 14 is connected to two adjacent elongated charging members 14 via hinge units 16 on the end of each elongated charging member 14. In the depicted embodiment of FIGS. 6A-C, five elongated charging members 14 are distributed in a pentagonal shape, though it is understood that any number of elongated charging members 14 greater than three can be used in such a configuration (e.g., three elongated charging members 14 in a triangular configuration, four elongated charging members 14 in a quadrilateral configuration, six elongated charging members 14 in a hexagonal configuration, etc.). Further, within modular decor apparatus 60, ceiling connecting wires 64 connect each hinge unit 16 to vertex 62. Vertex 62 is connected to the ceiling. Vertex 62 can be connected to a power source, thereby allowing power to flow through vertex 62, and through ceiling connecting wires 64 to power elongated charging members 14 via conductors 18. The magnetic attachment of modular units 24 occurs in the same fashion as those of the floor and desk mounted embodiment of modular decor apparatus 10, as described in the description of FIGS. 1A-2B. While the depicted embodiment of FIGS. 6A-6C shows task light modular unit 100 and ambient light modular unit 200, it is understood that any additional or alternative modular units 24 can be included.

Modular decor apparatus 60 in the embodiment of FIGS. 6A-6C operates akin to modular decor apparatus 10 of FIGS. 1A-2B. Vertex 62 connects to a power source, thereby powering modular decor apparatus 60. Current from the power source flows through ceiling connecting wires 64 and through conductors 18, magnetizing elongated charging members 14. Modular units 24 coupled to elongated charging member 14 are powered via the current flowing through conductor 18.

Figures 7A, 7B, 7C:
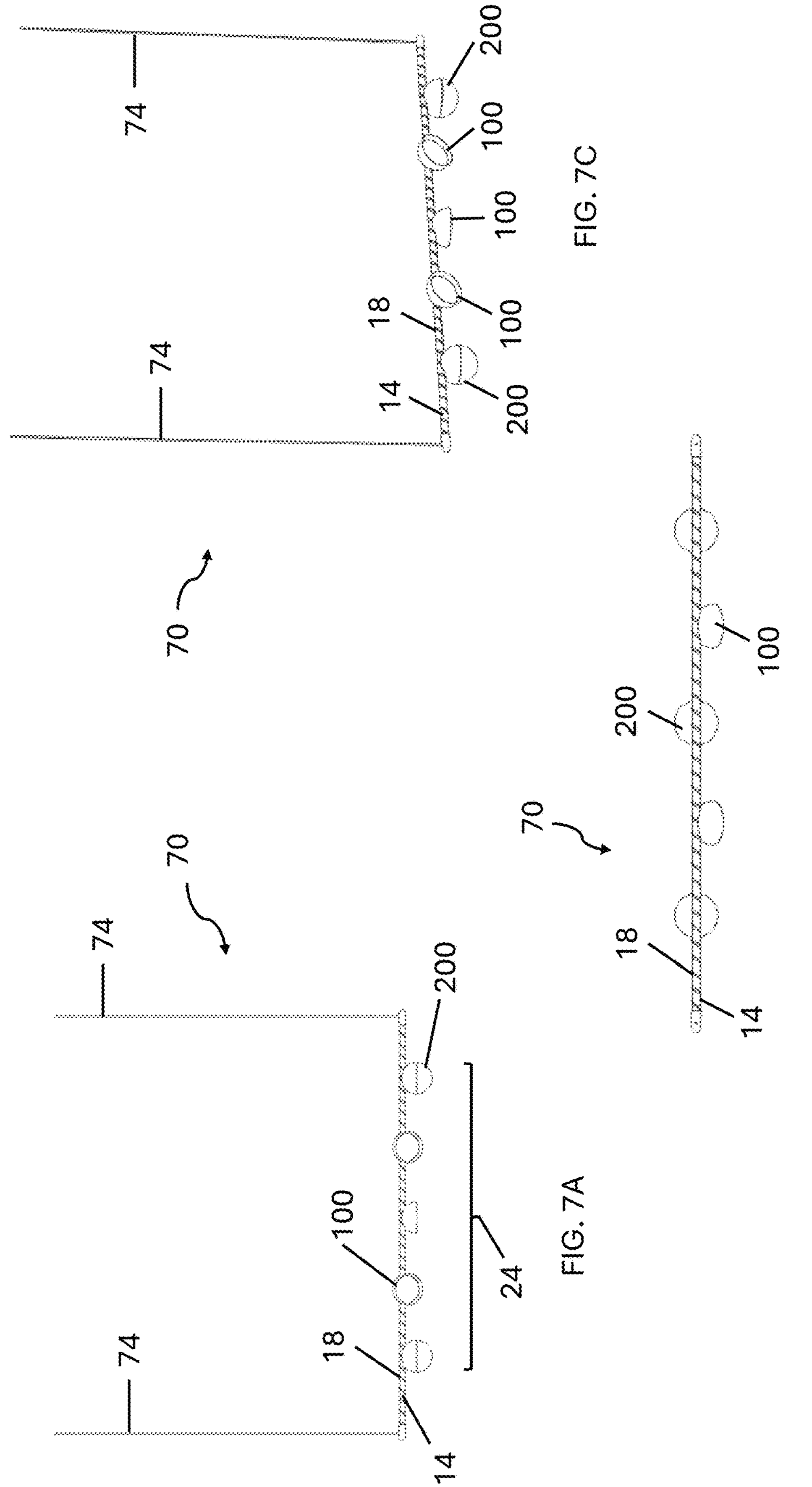
FIG. 7A is a side view of a third embodiment of the modular decor apparatus attachable to the ceiling and including the multiple attachable modular units.
FIG. 7B is a top view of a third embodiment of the modular decor apparatus attachable to the ceiling and including the multiple attachable modular units.
FIG. 7C is a perspective view of a third embodiment of the modular decor apparatus attachable to the ceiling and including the multiple attachable modular units.
Figures 8A, 8B, 8C, 8D, 8E:
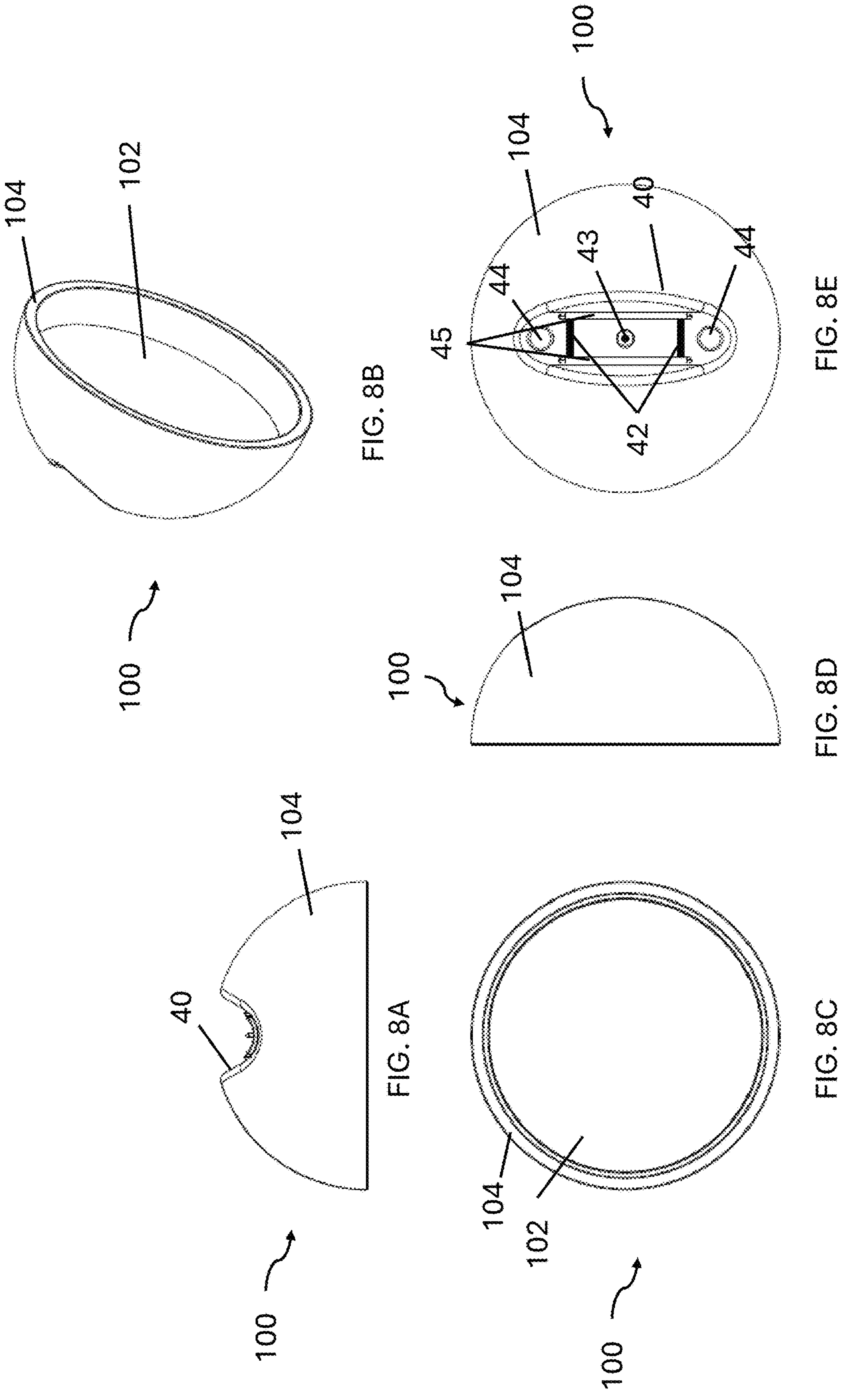
FIG. 8A is a top view of an attachable task light modular unit.
FIG. 8B is a perspective view of an attachable task light modular unit.
FIG. 8C is a front view of an attachable task light modular unit.
FIG. 8D is a side view of an attachable task light modular unit.
FIG. 8E is a rear view of an attachable task light modular unit.
Figure 9A:
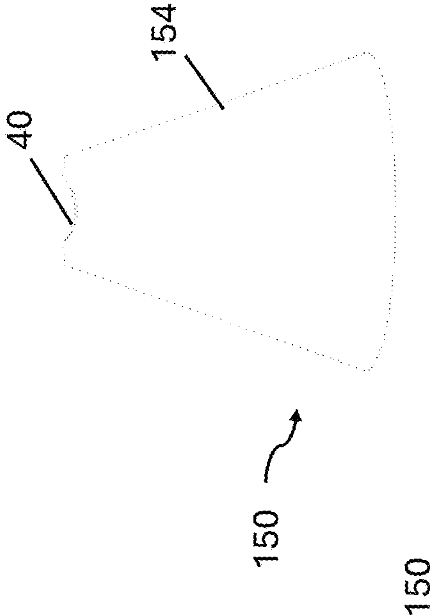
FIG. 9A is a top view of an elongated embodiment of the attachable task light modular unit.
Figure 9B:
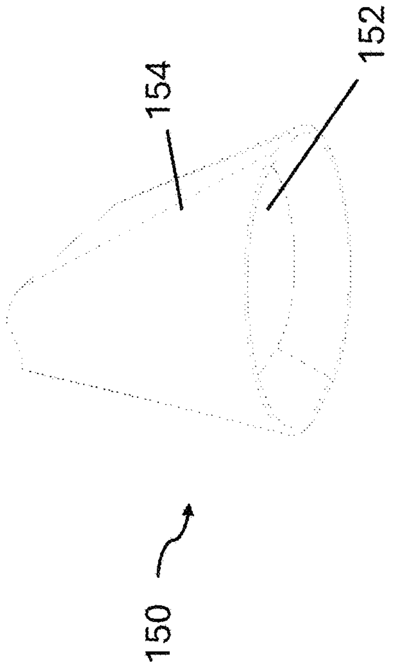
FIG. 9B is a perspective view of an elongated embodiment of the attachable task light modular unit.
Figure 9C:
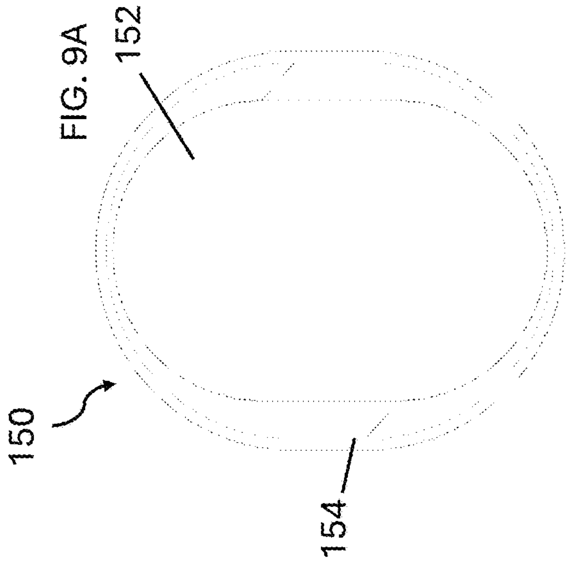
FIG. 9C is a front view of an elongated embodiment of the attachable task light modular unit.
Figure 9D:
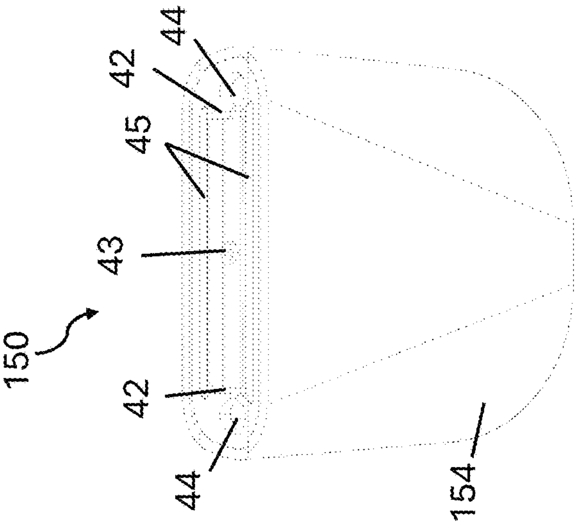
FIG. 9D is an additional perspective view of an elongated embodiment of the attachable task light modular unit.
Figure 9E:
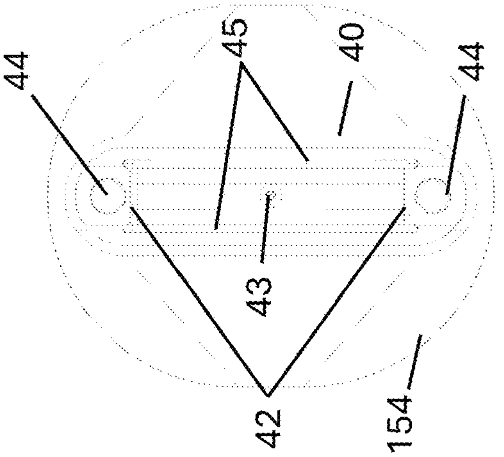
FIG. 9E is a rear view of an elongated embodiment of the attachable task light modular unit.
Figure 10A:
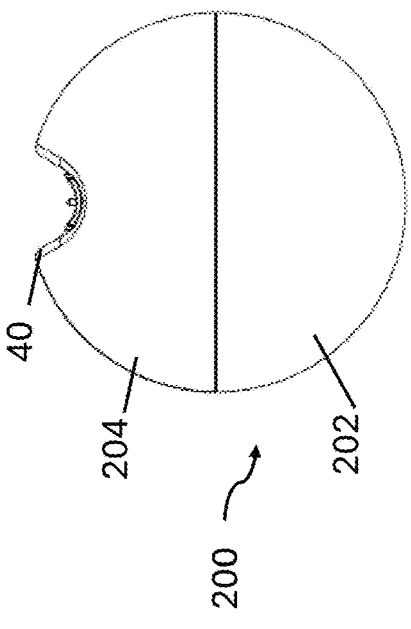
FIG. 10A is a top view of an attachable ambient light modular unit.
Figure 10B:
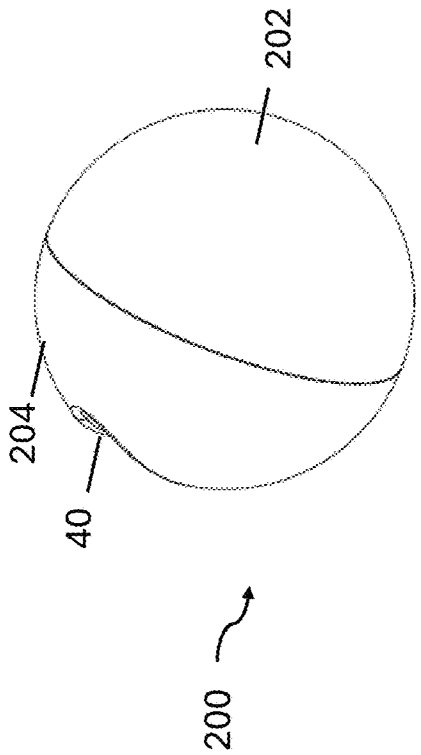
FIG. 10B is a perspective view of an attachable ambient light modular unit.
Figure 10C:
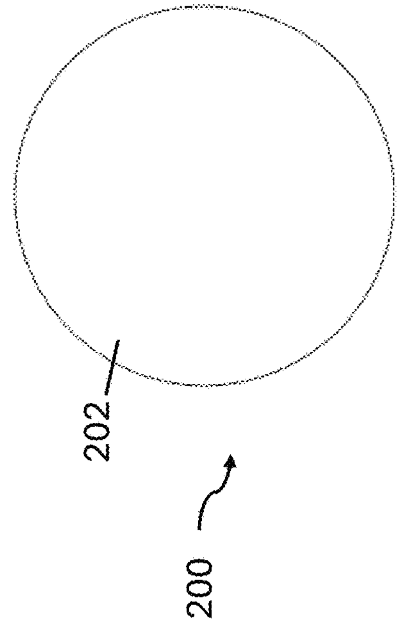
FIG. 10C is a front view of an attachable ambient light modular unit.
Figure 10D:
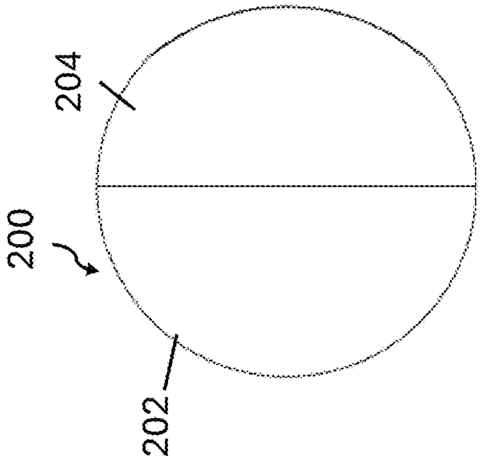
FIG. 10D is a side view of an attachable ambient light modular unit.
Figure 10E:
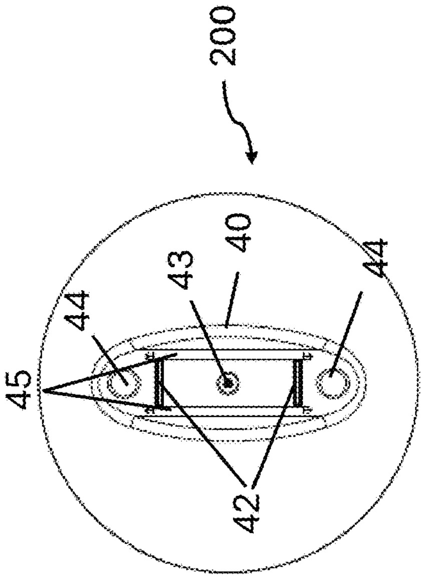
FIG. 10E is a rear view of an attachable ambient light modular unit.
Figure 11A:
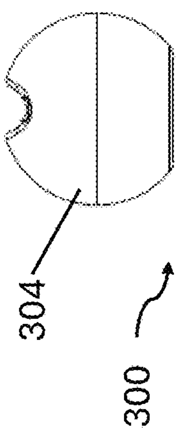
FIG. 11A is a top view of an attachable speaker modular unit.
Figure 11B:
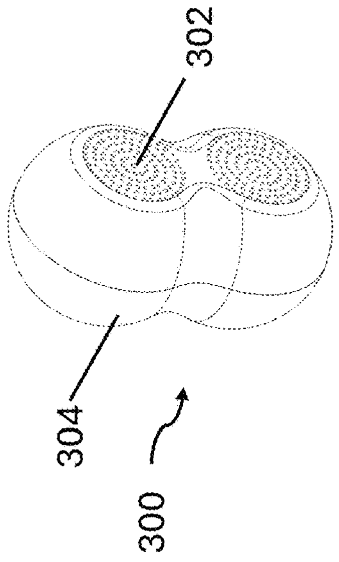
FIG. 11B is a perspective view of an attachable speaker modular unit.
Figure 11C:
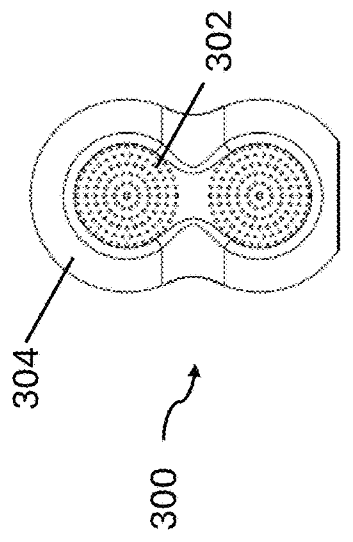
FIG. 11C is a front view of an attachable speaker modular unit.
Figure 11D:
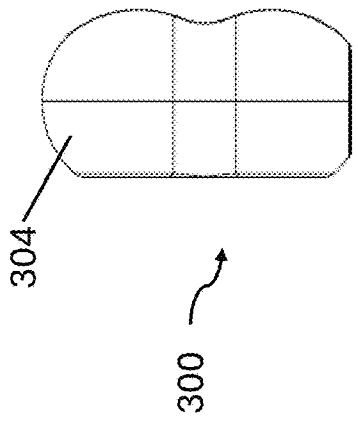
FIG. 11D is a side view of an attachable speaker modular unit.
Figure 11E:
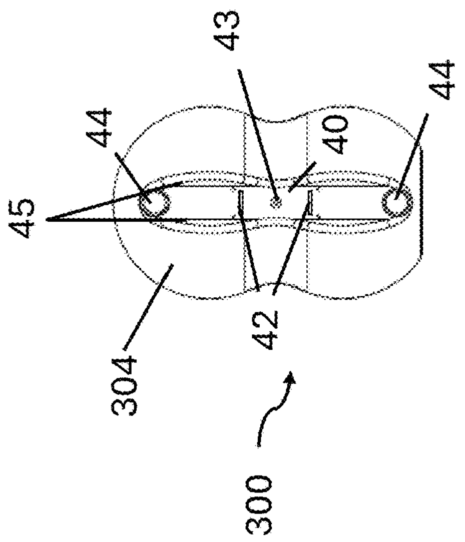
FIG. 11E is a rear view of an attachable speaker modular unit.
Figure 12A:
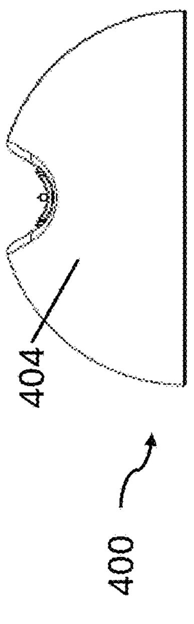
FIG. 12A is a top view of an attachable charging port modular unit.
Figure 12B:
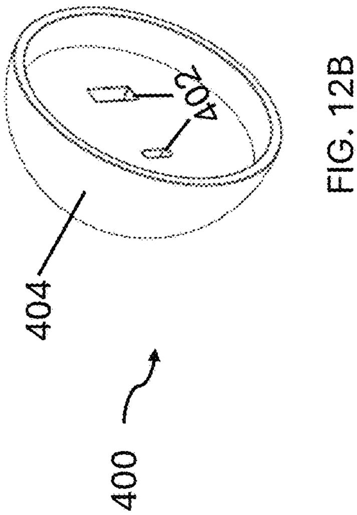
FIG. 12B is a perspective view of an attachable charging port modular unit.
Figure 12C:
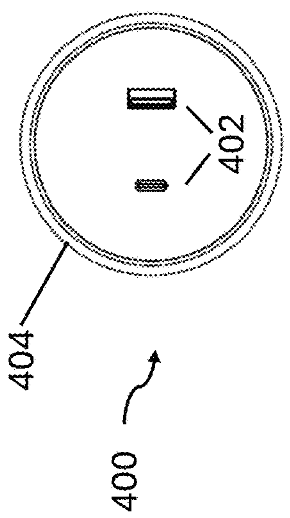
FIG. 12C is a front view of an attachable charging port modular unit.
Figure 12D:
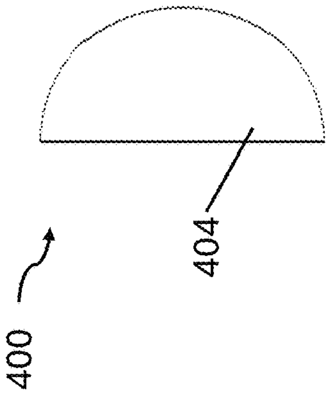
FIG. 12D is a side view of an attachable charging port modular unit.
Figure 12E:
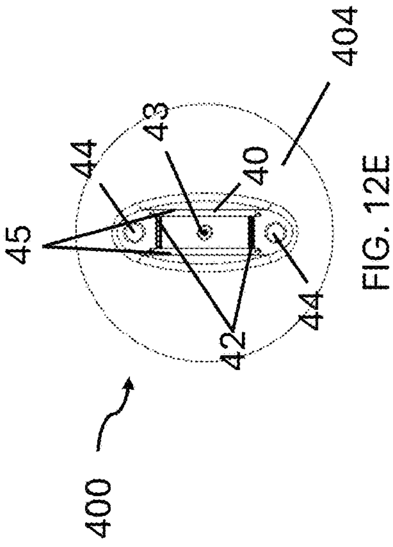
FIG. 12E is a rear view of an attachable charging port modular unit.

FIGS. 7A-7C depict a side, top, and perspective view of modular decor apparatus 70. Modular decor apparatus 70 is a third embodiment of modular decor apparatus 10 that is configured to be mounted on a ceiling, or a similar mounting surface. Modular decor apparatus 70 includes ceiling connecting wires 74, elongated charging member 14, conductors 18, and modular units 24. Modular units 24 include task light modular unit 100, ambient light modular unit 200.

Modular decor apparatus 70 of FIGS. 7A-7C differs from the embodiment of modular decor apparatus 10 of FIGS. 1A-2B in the layout of the component parts. Within modular decor apparatus 70, elongated charging member 14 is connected at a first end and at a second end to ceiling connecting wires 74. Ceiling connecting wires 74 are connected to the ceiling. Ceiling connecting wires 74 can be connected to a power source, thereby allowing power to flow through ceiling connecting wires 74 to power elongated charging member 14 via conductors 18. The magnetic attachment of modular units 24 occurs in the same fashion as those of the floor and desk mounted embodiment of modular decor apparatus 10, as described in the description of FIGS. 1A-2B. While the depicted embodiments of FIGS. 7A-7C show task light modular unit 100 and ambient light modular unit 200, it is understood that any additional or alternative modular units 24 can be included.

Modular decor apparatus 70 in the embodiment of FIGS. 7A-7C operates akin to modular decor apparatus 10 of FIGS. 1A-2B. Ceiling connecting wires 74 connect to a power source, thereby powering modular decor apparatus 70. Current from the power source flows through ceiling connecting wires 74 and through conductors 18, magnetizing elongated charging members 14. Modular units 24 coupled to elongated charging member 14 are powered via the current flowing through conductor 18.

The ceiling mounted embodiments depicted in FIGS. 5A-7C provide similar benefits and advantages as modular decor apparatus 10 of FIGS. 1A-2B. Additionally, the ceiling mounted embodiments allow for flexibility in ceiling mounting. While FIGS. 5A-7C depict three different embodiments, the embodiments being representative of different configurations in which modular decor apparatus 50, 60, and 70 can be mounted, this disclosure contemplates additional configurations. For example, a track lighting configuration can include elongated charging members 14 extending via one or more tracks attached to a base, the base being fixed on a ceiling. Additionally, or alternatively, a chandelier configuration can include elongated charging members 14 that extend from a base at one or more angles with respect to a horizontal place. In still other configurations, one or more elongated charging members 14 can extend vertically downward from a ceiling base. The foregoing are merely intended as examples of varying embodiments, and it is understood that any number and any orientation of elongated charging members 14 can be used in a ceiling mounted embodiment of the modular decor apparatus.

FIGS. 8A-8E depict a top view, perspective view, front view, side view, and rear view of task light modular unit 100. Task light modular unit 100 includes bulb 102, housing 104, and connection cavity 40. Connection cavity 40 includes molded features 42, spring loaded pin 43, magnetic pins 44, and electrical contact lines 45. As depicted, bulb 102 is on a front side of task light modular unit 100. Bulb 102 is recessed within housing 104. Housing 104, as depicted, is a substantially hemispherical housing, configured for directing the light provided from bulb 102 in a given direction. It is understood, however, that any housing configuration can be used in task light modular unit 100 to house bulb 102. In some embodiments, bulb 102 can be more or less recessed within housing 104. In some embodiments, housing 104 can include a front facing annulus to obscure an outer circumferential portion of bulb 102. In still other embodiments, bulb 102 can be differently shaped, sized, or oriented and can have varying colors and intensity. Bulb 102 can be, for example, dimmable, or have multiple discrete brightness levels.

Task light modular unit 100 can have various shapes (e.g., spherical, cubical, cylindrical, annular, etc.) and can be of any size suitable for mounting on elongated charging member 14. Task light modular unit 100 can, in some embodiments, include buttons, or other interactive elements, for turning task light modular unit 100 on or off.

In some embodiments, bulb 102 comprises one or more light emitting diodes (LEDs). In some embodiments, bulb 102 is removable and/or changeable. In some embodiments, task light module unit 100 includes an internal heat dissipation system, for example, attached to the LEDs of bulb 102.

In operation, task light modular unit 100 is magnetically couplable to elongated charging member 14 of modular decor apparatus 10 via magnetic pins 44. Task light modular unit 100 draws electrical power from conductor 18 via electrical contact lines 45. Molded features 42 can include any non-conductive material such as plastic. Molded features 42 span between electrical contact lines 45, thereby ensuring that positive and negative terminals of electrical contact lines 45 do not create a short circuit. Spring loaded pin 43 provides a conductive surface contacting elongated charging member 14, thereby establishing an electrical connection to ground. Thus, upon magnetic coupling of connection cavity 40 to elongated charging member 14, task light modular unit 100 is operational, and bulb 102 is lit. In some embodiments, a switch can be mounted on task light modular unit 100, the switch being configured to enable and disable power to bulb 102.

As described, task light modular unit 100 is rotatable and longitudinally translatable along elongated charging member 14, and further pivotable along pivot shaft 22. Thus, task light modular unit 100 can advantageously be directed to provide light in desired directions. Task light modular unit 100 can also be detached and removed from modular decor apparatus 10 if no longer needed, while other modules can remain attached and operational.

FIGS. 9A-9E depict a top view, perspective view, front view, additional perspective view, and rear view of elongated task light modular unit 150. Elongated task light modular unit 150 is an additional embodiment of task light modular unit 100 with a different housing shape and bulb shape than task light modular unit 100. Elongated task light modular unit 150 includes bulb 152, housing 154, and connection cavity 40. Connection cavity 40 includes molded features 42, spring loaded pin 43, magnetic pins 44, and electrical contact lines 45. Elongated task light modular unit 150 is shaped such that a front side is longer than a rear side. Thus, a length of housing 154 is greater at front side of elongated task light modular unit 150, adjacent to where bulb 152 is disposed than the length of the rear side where connection cavity 40 is disposed. The length of housing 154 continuously decreases from the front side to the rear side of elongated task light modular unit 150.

As depicted, bulb 152 is on the front side of elongated task light modular unit 100. Bulb 152 is recessed within housing 154. Housing 154, as depicted, is an elongated shape having a front face ovular cross-section, configured for directing the light provided from bulb 152 in a given direction. In some embodiments, bulb 152 can be more or less recessed within housing 154. In still other embodiments, bulb 152 can be differently shaped, sized, or oriented and can have varying colors and intensity. Bulb 152 can be, for example, dimmable, or have multiple discrete brightness levels. Elongated task light modular unit 150 can, in some embodiments, include buttons, or other interactive elements, for turning elongated task light modular unit 150 on or off.

In some embodiments, bulb 152 comprises one or more light emitting diodes (LEDs). In some embodiments, bulb 152 is removable and/or changeable. In some embodiments, elongated task light modular unit 150 includes an internal heat dissipation system, for example, attached to the LEDs of bulb 152.

In operation, elongated task light modular unit 150 is magnetically couplable to elongated charging member 14 of modular decor apparatus 10 via magnetic pins 44. Elongated task light modular unit 150 is connected to elongated charging member 14 and operable by drawing electrical power from conductor 18 in the same manner as task light modular unit 100. Elongated task light modular unit 150 is also rotatable and translatable along elongated charging member 14 in the same manner described with respect to task light modular unit 100.

FIGS. 10A-10E depict a top view, perspective view, front view, side view, and rear view of ambient light modular unit 200. Ambient light modular unit 200 includes bulb 202, housing 204, and connection cavity 40. Connection cavity 40 includes molded features 42, spring loaded pin 43, magnetic pins 44, and electrical contact lines 45. As depicted, bulb 202 is on a front side of task light modular unit 100. Bulb 202 is substantially hemispherical for providing ambient light. In some embodiments, bulb 202 (or other translucent cover surrounding bulb 202) is spherical, and housing 204 is not included. In such an embodiment, ambient light modular unit 200 is configured to direct ambient light in 360 degrees of light transmission. It is understood, however, that any housing configuration can be used in ambient light modular unit 200 to house bulb 202 and provide ambient light therefrom. In some embodiments, bulb 202 can be differently shaped, sized, or oriented and can have varying colors and intensity. Bulb 202 can be, for example, dimmable, or have multiple discrete brightness levels.

Ambient light modular unit 200 can have various shapes (e.g., spherical, cubical, cylindrical, annular, etc.) and can be of any size suitable for mounting on elongated charging member 14. Ambient light modular unit 200 can, in some embodiments, include buttons, or other interactive elements, for turning ambient light modular unit 200 on or off.

In some embodiments, bulb 202 comprises one or more light emitting diodes (LEDs). In some embodiments, bulb 202 is removable and/or changeable. In some embodiments, ambient light modular unit 200 includes an internal heat dissipation system, for example, attached to the LEDs of bulb 202.

In operation, ambient light modular unit 200 is magnetically couplable to elongated charging member 14 of modular decor apparatus 10 via magnetic pins 44. Ambient light modular unit 200 draws electrical power from conductor 18 via electrical contact lines 45. Molded features 42 can include any non-conductive material such as plastic. Molded features 42 span between electrical contact lines 45, thereby ensuring that positive and negative terminals of electrical contact lines 45 do not create a short circuit. Spring loaded pin 43 provides a conductive surface contacting elongated charging member 14, thereby establishing an electrical connection to ground. Thus, upon magnetic coupling of connection cavity 40 to elongated charging member 14, ambient light modular unit 200 is operational, and bulb 202 is lit. In some embodiments, a switch can be mounted on ambient light modular unit 200, the switch being configured to enable and disable power to bulb 202.

As described, ambient light modular unit 200 is rotatable and longitudinally translatable along elongated charging member 14, and further pivotable along pivot shaft 22. Thus, ambient light modular unit 200 can advantageously be translated and rotated to provide ambient light at various longitudinal height and rotational directions. Ambient light modular unit 200 can also be detached and removed from modular decor apparatus 10 if no longer needed, while other modules can remain attached and operational.

FIGS. 11A-11E depict a top view, perspective view, front view, side view, and rear view of wireless speaker modular unit 300. Wireless speaker modular unit 300 includes speaker output face 302, housing 304, and connection cavity 40. Connection cavity 40 includes molded features 42, spring loaded pin 43, magnetic pins 44, and electrical contact lines 45. As depicted, speaker output face 302 is on a front side of wireless speaker modular unit 300, but it is understood that wireless speaker face can be oriented on any side of wireless speaker modular unit 300. In some embodiments, multiple sides of wireless speaker modular unit 300 can include speaker output face 302 such that sound emits from multiple side of wireless speaker modular unit 300.

Wireless speaker modular unit 300 can have various shapes (e.g., spherical, cubical, cylindrical, annular, etc.) and can be of any size suitable for mounting on elongated charging member 14. Wireless speaker modular unit 300 can be wirelessly connectable to an external device via Bluetooth, or any other suitable communication means for data transfer. Wireless speaker modular unit 300 can, in some embodiments, contain a variety of buttons, or other interactive elements, for turning wireless speaker modular unit 300 on or off and/or for establishing connectivity between wireless speaker modular unit 300 an external device. In some embodiments, wireless speaker module 300 can be a chargeable module which is charged via the electrical connection between wireless speaker modular unit 300 and elongated charging member 14. In such an embodiment, wireless speaker modular unit 300 can continue to be operational upon detachment from modular decor apparatus.

In operation, wireless speaker modular unit 300 is magnetically couplable to elongated charging member 14 of modular decor apparatus 10 via magnetic pins 44. Wireless speaker modular unit 300 draws electrical power from conductor 18 via electrical contact lines 45. Molded features 42 can include any non-conductive material such as plastic. Molded features 42 span between electrical contact lines 45, thereby ensuring that positive and negative terminals of electrical contact lines 45 do not create a short circuit. Spring loaded pin 43 provides a conductive surface contacting elongated charging member 14, thereby establishing an electrical connection to ground. Thus, upon magnetic coupling of connection cavity 40 to elongated charging member 14, wireless speaker modular unit 300 is operational, and sound can be emitted from speaker face 302. In some embodiments, a switch can be mounted on wireless speaker modular unit 300, the switch being configured to enable and disable power to wireless speaker modular unit 300.

As described, wireless speaker modular unit 300 is rotatable and longitudinally translatable along elongated charging member 14, and further pivotable along pivot shaft 22. Thus, wireless speaker modular unit 300 can advantageously be translated and rotated to direct sound from a connected device in a desired direction. Wireless speaker modular unit 300 can also be detached and removed from modular decor apparatus 10 if no longer needed, while other modules can remain attached and operational. Wireless speaker modular unit 300 can, in some embodiments, continue to be operational after detachment from modular decor apparatus 10.

FIGS. 12A-12E depict a top view, perspective view, front view, side view, and rear view of charging port(s) modular unit 400. Charging port(s) modular unit 400 includes ports 402, housing 404, and connection cavity 40. Connection cavity 40 includes molded features 42, spring loaded pin 43, magnetic pins 44, and electrical contact lines 45. As depicted, ports 104 are on a front side of charging port(s) modular unit 400. It is understood, however, that ports 402 can be mounted on any surface of charging port(s) modular unit 400. Ports 402 can include universal serial bus (USB) ports including USB-A, USB-B, USB-C. Ports 402 can include an alternating current outlet, or any other suitable connection ports for connecting external devices. Alternatively or in addition to ports 402, charging port(s) modular unit 402 can include a wireless charging surface. Though two ports are depicted in FIGS. 12A-12E, it is understood that any number of ports (i.e., one, two, three, or more than three) can be included within ports 402.

In operation, charging port(s) modular unit 400 is magnetically couplable to elongated charging member 14 of modular decor apparatus 10 via magnetic pins 44. Charging port(s) modular unit 400 draws electrical power from conductor 18 via electrical contact lines 45. Molded features 42 can include any non-conductive material such as plastic. Molded features 42 span between electrical contact lines 45, thereby ensuring that positive and negative terminals of electrical contact lines 45 do not create a short circuit. Spring loaded pin 43 provides a conductive surface contacting elongated charging member 14, thereby establishing an electrical connection to ground. Thus, upon magnetic coupling of connection cavity 40 to elongated charging member 14, charging port(s) modular unit 400 is operational, and externally connected devices receive power (e.g., charging power). In some embodiments, a switch can be mounted on charging port(s) modular unit 400, the switch being configured to enable and disable power to ports 202.

As described, charging port(s) modular unit 400 is rotatable and longitudinally translatable along elongated charging member 14, and further pivotable along pivot shaft 22. Thus, charging port(s) modular unit 400 can advantageously be translated and rotated to provide connectable ports at various longitudinal height and rotational directions. This can be particularly advantageous for accommodating various cable lengths for externally connected devices. Charging port(s) modular unit 400 can also be detached and removed from modular decor apparatus 10 if no longer needed, while other modules can remain attached and operational The description of FIGS. 8A-12E depict various modules for mounting upon modular decor apparatus 10. The various modules are intended to be non-limiting, and it is understood that any number of additional modules that are electrically connectable and magnetically couplable to modular decor apparatus 10 can be used. Non-limiting examples include a wireless charging surface module, a reusable battery charger module, an aromatic emission module, a ring light module, a Wi-Fi router module, and a fan module. The techniques of this disclosure are suitable for any low-voltage modular unit. Various other examples of modular units are contemplated by this disclosure.

The techniques of this disclosure allow for a modular decor apparatus and corresponding modules. The modularity of the various modules renders the modular decor apparatus as multi-functional. Additionally, the modular decor apparatus is mountable in a variety of locations based on the base configuration. Further, the configuration of the current carrying conductor coiled around the elongated charging member of the modular decor apparatus, allows for magnetic mounting of the modules and electrical power to be delivered to the modules. Such a configuration allows for ease of translation and rotation of the modules to direct them in a desired direction.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments for purposes of illustration only. One skilled in the art will readily recognize from the discussion herein that alternative embodiments of the structures and methods illustrated herein may be employed without departing from the principles described herein.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

While the systems and methods described herein have been described in reference to some exemplary embodiments, these embodiments are not limiting and are not necessarily exclusive of each other, and it is contemplated that particular features of various embodiments may be omitted or combined for use with features of other embodiments while remaining within the scope of the invention.

The invention claimed is:

1. A modular decor apparatus, comprising:

a base;

an elongated charging member connected to the base, the elongated charging member comprising at least one shaft and a current carrying conductor coiled around the at least one shaft, wherein the current carrying conductor conducts an electrical signal from a power source; and at least one modular powered unit removably coupled to the elongated charging member by a magnetic force, the at least one modular powered unit capable of receiving the electrical signal from the elongated charging member to power the at least one modular powered unit.

2. The modular decor apparatus of claim 1, wherein the elongated charging member has a first end connected to the base and a second end, the elongated charging member extending from the base from the first end to the second end.

3. The modular decor apparatus of claim 1, wherein the at least one modular powered unit comprises a charging surface that mates with an outer surface of the elongated charging member.

4. The modular decor apparatus of claim 3, wherein:

the at least one modular powered unit is longitudinally translatable along the outer surface of the elongated charging member while continually receiving the electrical signal from the elongated charging member; and the at least one modular powered unit is rotatable about the outer surface of the elongated charging member while continually receiving the electrical signal from the elongated charging member.

5. The modular decor apparatus of claim 1, wherein the at least one modular powered unit comprises at least one of a task light configured to direct light, an ambient light configured to provide ambient light, a ring light, a charging port configuration, and a speaker.

6. The modular decor apparatus of claim 5, wherein the charging port configuration comprises a Universal Serial Bus A (USB-A) port, a USB-C port, and/or a wireless charging surface.

7. The modular decor apparatus of claim 5, wherein the speaker is wirelessly connectable to an external device.

8. The modular decor apparatus of claim 5, wherein the task light comprises a hemispherical cover about a light source.

9. The modular decor apparatus of claim 5, wherein the ambient light comprises a substantially spherical translucent cover surrounding a light source.

10. The modular decor apparatus of claim 1, further comprising a pivotable hinge unit positioned along the elongated charging member.

11. The modular decor apparatus of claim 10, wherein:

the at least one shaft comprises a first shaft and a second shaft;

a first end of the first shaft is coupled to the base and a second end of the first shaft is coupled to a first receiving end of the pivotable hinge unit;

the second shaft is coupled to a second receiving end of the pivotable hinge unit, and the second shaft extends longitudinally therefrom; and the second shaft is pivotable with respect to the first shaft via the pivotable hinge unit.

12. The modular decor apparatus of claim 1, wherein the power source is a battery housed within the base.

13. The modular decor apparatus of claim 1, wherein the current carrying conductor is electrically connected to the power source via a wired connection.

14. The modular decor apparatus of claim 13, further comprising a power switch operably coupled between the base and the power source.

15. The modular decor apparatus of claim 1, wherein the base comprises a mounting side, an external facing side, a top side, and a bottom side, wherein the mounting side is attachable to a mounting surface.

16. The modular decor apparatus of claim 15, further comprising a touch-activated power switch on the external facing side of the base.

17. A modular decor apparatus, comprising:

at least one base;

at least one elongated charging member, the at least one elongated charging member comprising at least one track extending from the base and a current carrying conductor coiled around the at least one track, wherein the current carrying conductor conducts an electrical signal from a power source;

at least one modular powered unit removably coupled to the elongated charging member by a magnetic force, the at least one modular powered unit capable of receiving the electrical signal from the elongated charging member to power the at least one modular powered unit.

18. The modular decor apparatus of claim 17, wherein the base is configured to be mounted to a ceiling.

19. The modular decor apparatus of claim 17, wherein the track extends in a horizontal direction with respect to the base.

20. The modular decor apparatus of claim 17, wherein the at least one modular powered unit comprises a charging surface that mates with an outer surface of the elongated charging member.

* * * * *